(12) United States Patent
Liao

(10) Patent No.: US 11,371,648 B1
(45) Date of Patent: Jun. 28, 2022

(54) POSITIONING STRUCTURE FOR TRIPOD STAND FOR QUICKLY RELEASING CLAMPING STATE

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 0 days.

(21) Appl. No.: 17/234,168

(22) Filed: Apr. 19, 2021

(51) Int. Cl.
*F16M 11/38* (2006.01)
*F16M 11/24* (2006.01)

(52) U.S. Cl.
CPC ........... *F16M 11/38* (2013.01); *F16M 11/242* (2013.01); *F16M 2200/022* (2013.01)

(58) Field of Classification Search
CPC . F16M 11/38; F16M 11/242; F16M 2200/022
See application file for complete search history.

(56) References Cited

U.S. PATENT DOCUMENTS

| | | | |
|---|---|---|---|
| 5,072,910 A * | 12/1991 | May | F16M 11/42 248/412 |
| 5,794,899 A * | 8/1998 | Tamllos | F16M 11/26 248/166 |
| 7,438,266 B2 * | 10/2008 | May | F16M 11/34 248/431 |
| 9,447,912 B2 * | 9/2016 | De Faveri | F16M 11/32 |
| 10,794,532 B1 * | 10/2020 | Clark | G03B 17/561 |
| 11,047,523 B1 * | 6/2021 | Chang | G03B 17/561 |
| 2015/0338017 A1 | 11/2015 | De Faveri | |
| 2020/0209715 A1 * | 7/2020 | Christensen | F16M 11/16 |
| 2022/0025997 A1 * | 1/2022 | Liao | F16B 7/1418 |

* cited by examiner

*Primary Examiner* — Anita M King
(74) *Attorney, Agent, or Firm* — Muncy, Geissler, Olds & Lowe, P.C.

(57) ABSTRACT

A positioning structure for tripod stand for quickly releasing a clamping state, comprising a main tube, upper, middle and lower binding sleeves and three support rods. The binding sleeves are sleeved on the main tube to rotate freely. The middle binding sleeve comprises a sliding slot provided with an upper clamping column, a lower clamping column and a spring. The upper and lower clamping columns are connected with upper and lower pressing keys protruding out of the middle binding sleeve. When the pressing keys are pressed, the spring is compressed and the clamping columns no longer protrude from the upper and lower sides of the middle binding sleeve. The clamping state can be released and the support rods of the binding sleeves can be freely rotated by pressing the binding keys, so that the three support rods can be rotated to a storage position or an unfolding position.

7 Claims, 8 Drawing Sheets

POSITIONING STRUCTURE FOR TRIPOD STAND FOR QUICKLY RELEASING CLAMPING STATE

FIELD OF THE INVENTION

The invention relates to a positioning structure, in particular to a positioning structure for tripod stand for quickly releasing clamping state.

BACKGROUND OF THE INVENTION

As disclosed in U.S. Patent No. 2015/0338017 A1, a triangular support for photographic equipment is disclosed having three support rods after deployment for stable placement on a variety of terrains in a triangular support manner to meet usage requirements. After being stored, however, the three support rods can only be closed up towards the middle to be stored so as to form a cylinder with a large volume, which not only occupies space, but also is not easy to package and transport. It easily causes deformation due to external force pressure, and after deformation, the stability of the structure can be affected.

Therefore, referring to FIG. 1, it shows a conventional triangular support having a main tube 1 and three support rods 3 rotated relative to the main tube 1, the three support rods 3 can be stored by being rotated to the same plane relative to the main tube 1 and are integrally sheet-shaped after being stored, so that it is relatively easy to carry them in encasement. However, the three support rods 3 have a rotational degree of freedom relative to the main tube 1, and there is a problem that the center of gravity is shifted and it easily falls down when the relative positions at which the three support rods 3 are unfolded do not form a triangular support. The three stored support rods 3 also have the freedom degree of rotation relative to the main tube 1, so that additional binding ropes are needed to fix them so as to avoid causing a trouble of folding during transportation.

SUMMARY OF THE INVENTION

It is a primary object of the present invention to provide a positioning structure for tripod stand for quickly releasing clamping state, which is convenient for a user to quickly unfold three support rods.

In order to achieve the objection, the invention provides a positioning structure for tripod stand for quickly releasing a clamping state, comprising a main tube, an upper binding sleeve, a middle binding sleeve, a lower binding sleeve, and three support rods. The upper binding sleeve is sleeved on the main tube to rotate freely, wherein the upper binding sleeve is provided with an upper joint tube. The middle binding sleeve is sleeved on the main tube to rotate freely, wherein the middle binding sleeve is provided with a middle joint tube. The lower binding sleeve is sleeved on the main tube to rotate freely, wherein the lower binding sleeve is provided with a lower joint tube. Three support rods are respectively connected to the upper joint tube, the middle joint tube and the lower joint tube. The middle binding sleeve includes a sliding slot provided with an upper clamping column, a lower clamping column and a spring, and the spring pushes the upper clamping column and the lower clamping column to respectively protrude from an upper side and a lower side of the middle binding sleeve to clamp the upper binding sleeve and the lower binding sleeve, upholding the three support rods in a storage position or an unfolding position.

The upper clamping column and the lower clamping column are respectively connected with an upper pressing key and a lower pressing key, and the upper pressing key and the lower pressing key protrude out of the middle binding sleeve; and when the upper pressing key and the lower pressing key are pressed, the upper clamping column and the lower clamping column are not longer protruded from the upper side and the lower side of the middle binding sleeve by compressing the spring.

Accordingly, when the three support rods are in the storage position or the unfolding position, the upper clamping column and the lower clamping column respectively clamp the upper binding sleeve and the lower binding sleeve; and after the upper pressing key or the lower pressing key is pressed, the clamping state of the positioning structure is released, and two of the three support rods relative to the upper binding sleeve and the lower binding sleeve can be freely rotated, so that the three support rods can be rotated to the storage position or the unfolding position.

DETAILED DESCRIPTION OF THE PREFERRED EMBODIMENTS

Figure 1:
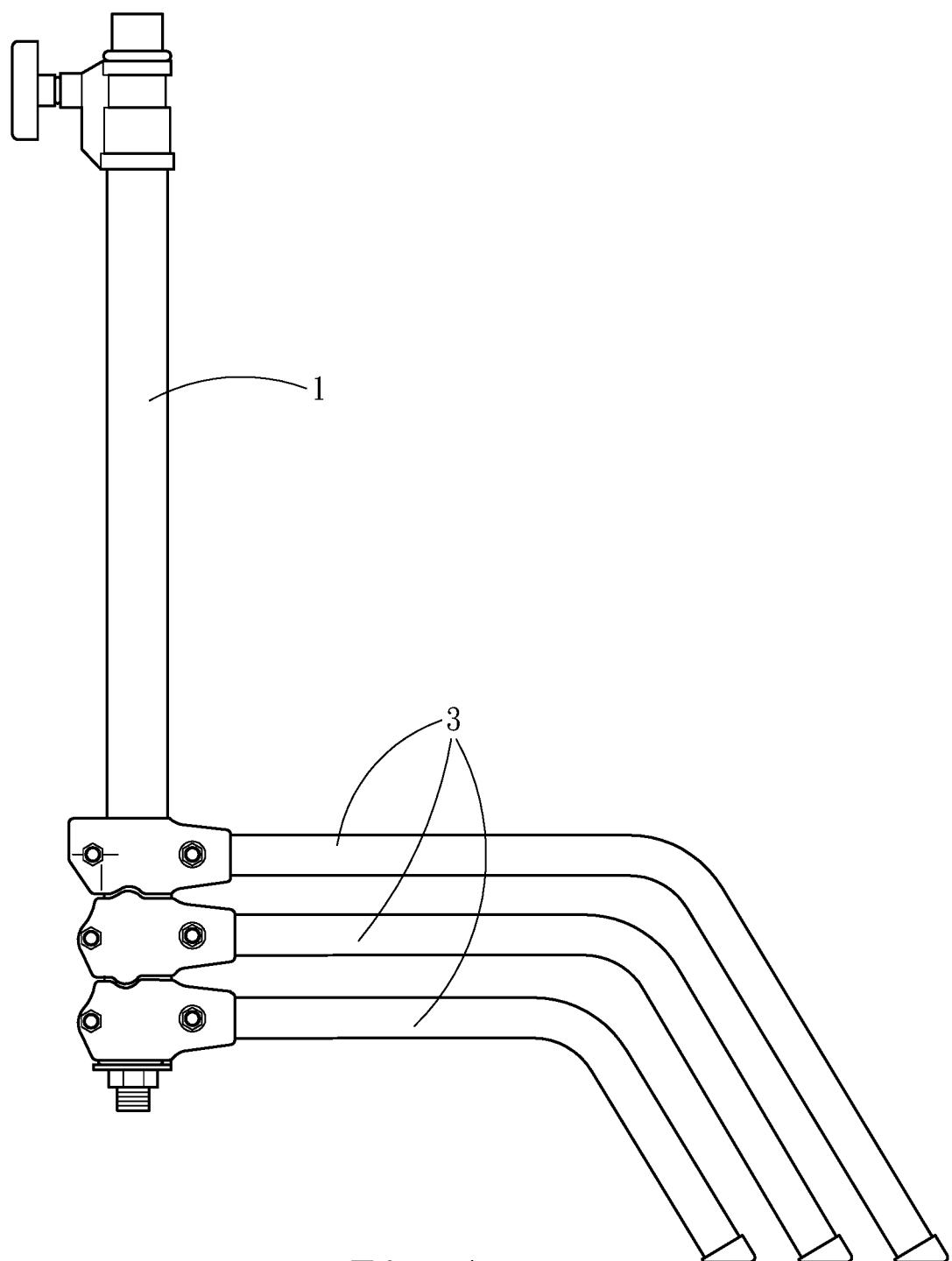
FIG. 1 is a front view of a prior art.

The technical features and efficacy of the present invention will be shown from the following detailed description of the preferred embodiments, taken in conjunction with the accompanying drawings.

Referring to FIG. 2, FIG. 3, FIG. 4 and FIG. 5, the present invention provides a positioning structure for tripod stand which is capable of quickly releasing a clamping state, comprising a main tube 10, an upper binding sleeve 20, a middle binding sleeve 30, a lower binding sleeve 40, three support rods 45, an upper limit sleeve 50 and a lower limit sleeve 60, wherein the upper binding sleeve 20 is sleeved on the main tube 10 to rotate freely, and the upper binding sleeve 20 is provided with an upper joint tube 21. The middle binding sleeve 30 is sleeved on the main tube 10 to rotate freely, and the middle binding sleeve 30 is provided with a middle joint tube 31. The lower binding sleeve 40 is sleeved on the main tube 10 to rotate freely, and the lower binding sleeve 40 is provided with a lower joint tube 41.

Figure 2:
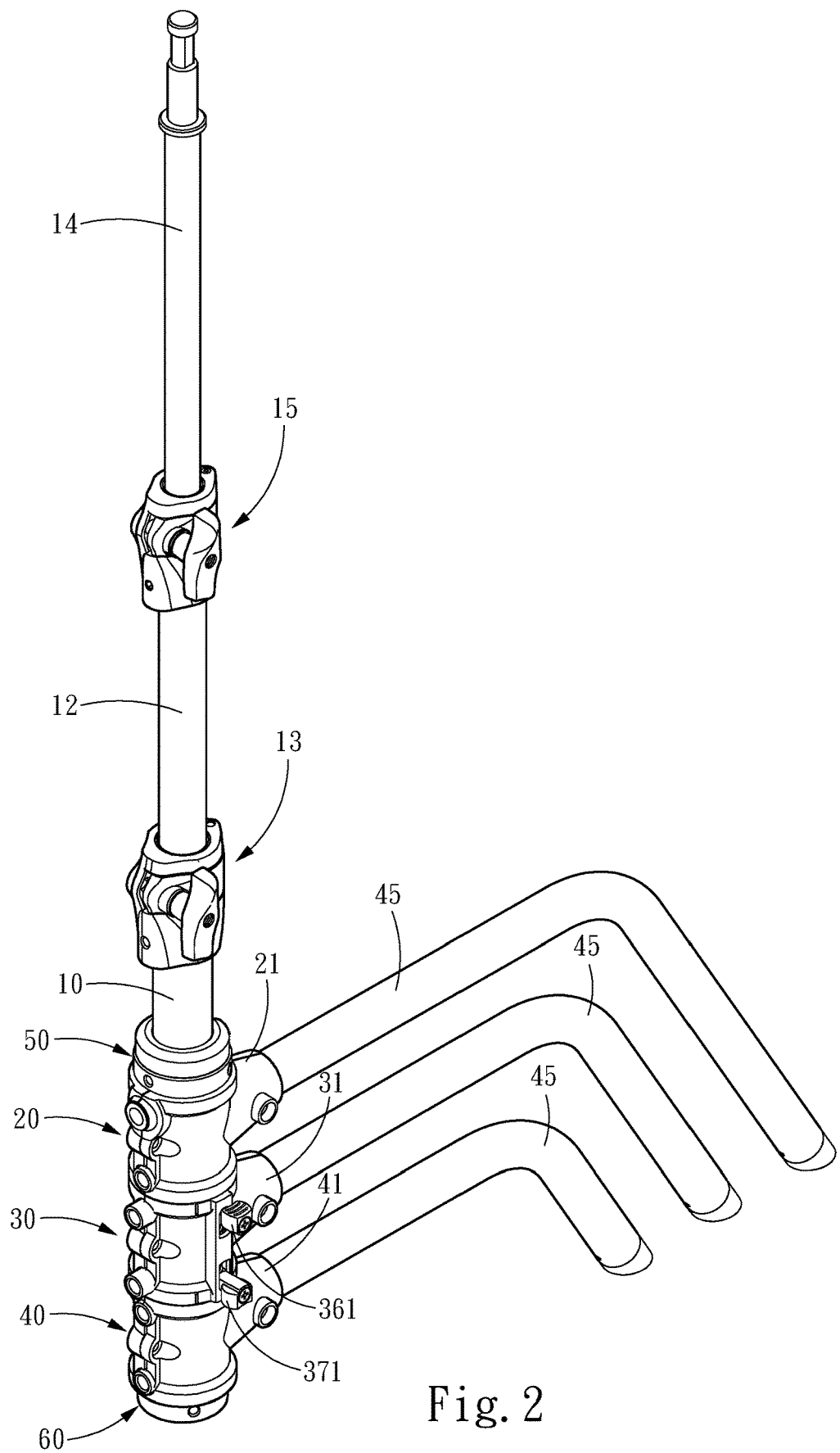
FIG. 2 is a perspective view of the present invention.
Figure 5:
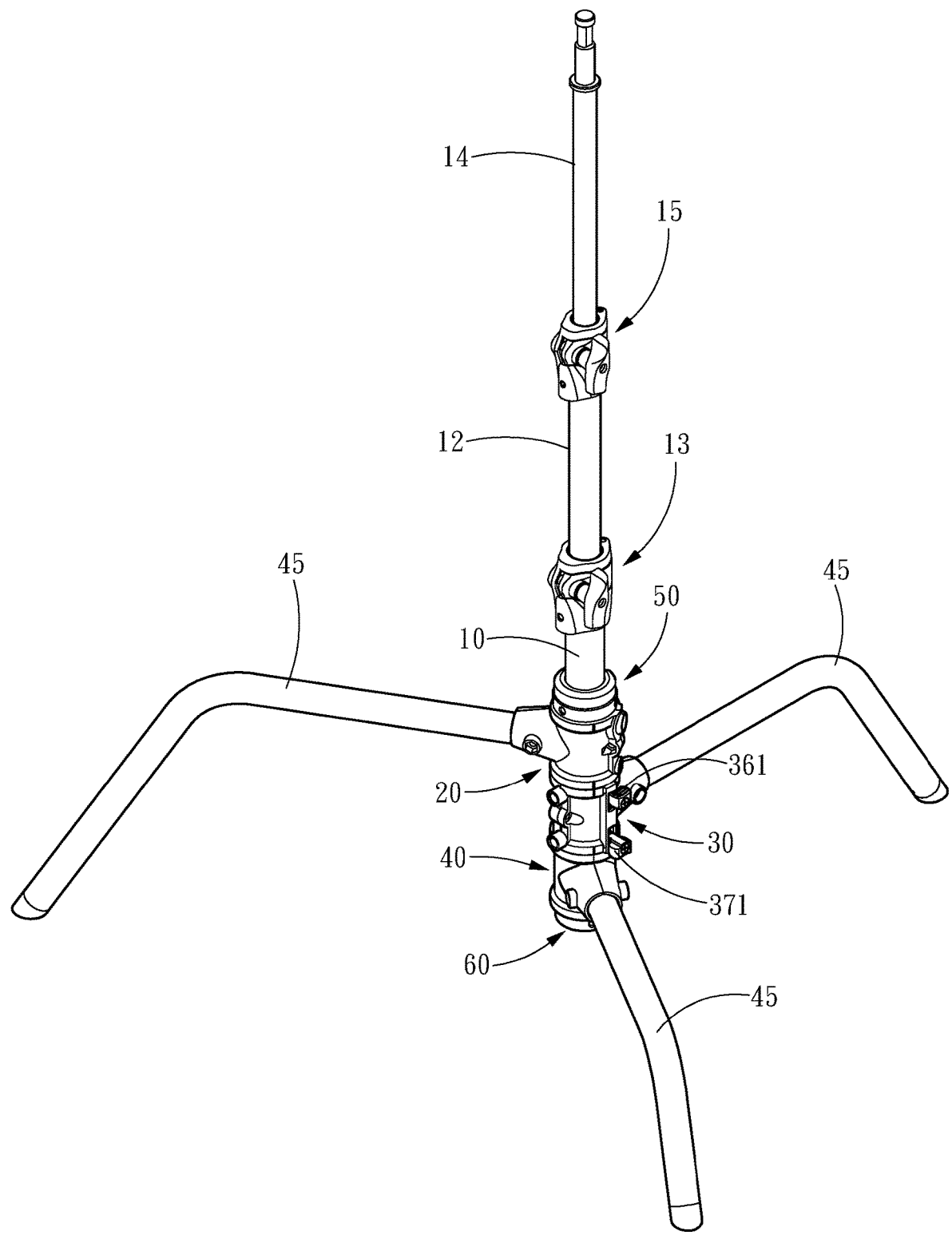
FIG. 5 is a perspective structure view of the present invention in an unfolding position.

The three support rods 45 are connected to the upper joint tube 21, the middle joint tube 31, and the lower joint tube 41, respectively; the upper binding sleeve 20, the middle binding sleeve 30, and the lower binding sleeve 40 are superposed together from top to bottom, and the three support rods 45 include a storage position and an unfolding position according to relative positions of the upper binding sleeve 20, the middle binding sleeve 30, and the lower binding sleeve 40. As shown in FIG. 2, the three support rods 45 are in the storage position, that is, the three support rods 45 are in a same plane. As shown in FIG. 5, the three support rods 45 are in the unfolding position, that is, the three support rods 45 form a tripod support structure, and central angles among the three support rods 45 are 120 degrees.

Figure 4:
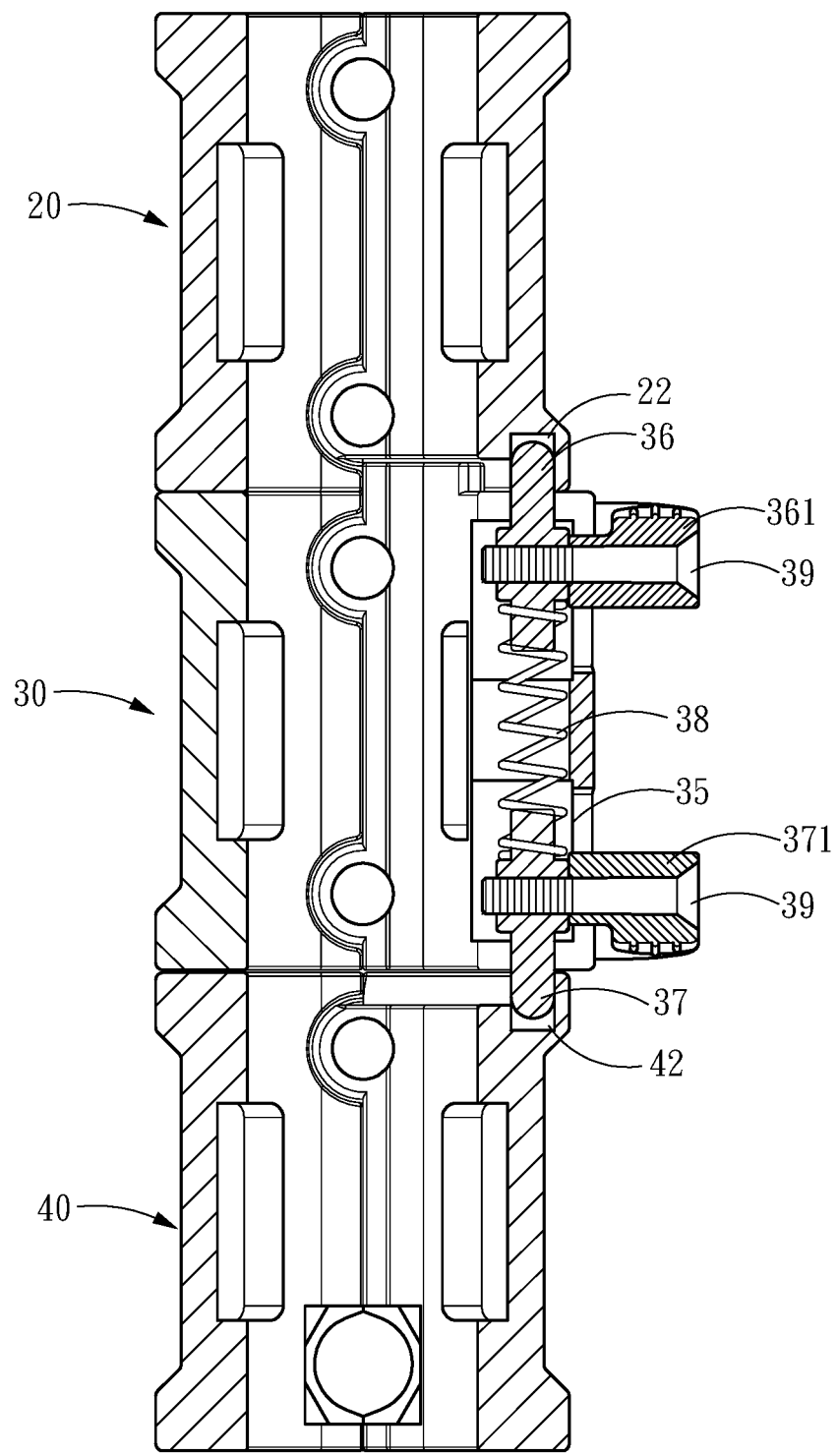
FIG. 4 is a partial section view of the present invention.
Figure 6A:
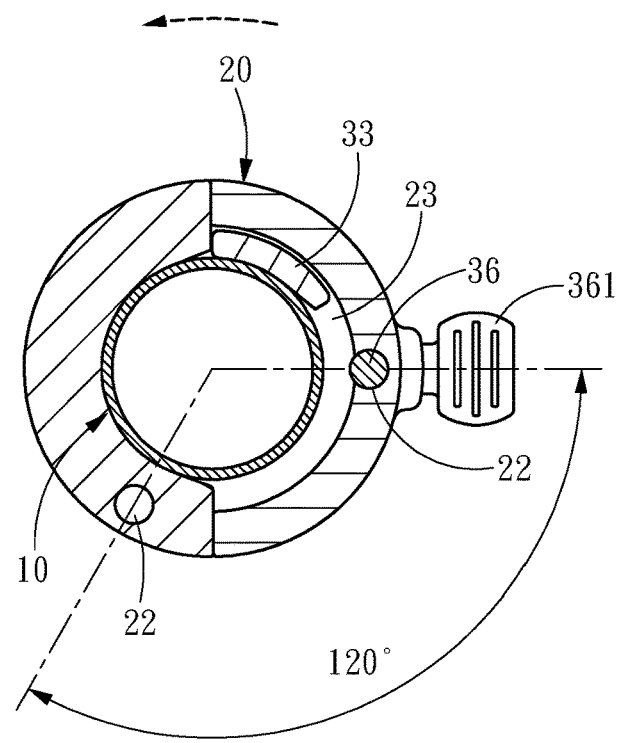
FIG. 6A is a schematic view of an upper binding sleeve clamping with a middle binding sleeve according to the present invention.
Figure 6B:
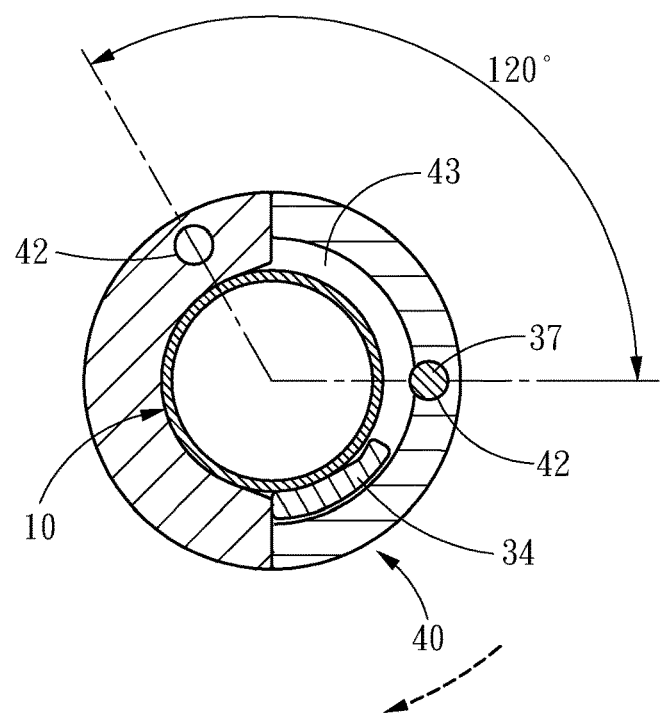
FIG. 6B is a schematic view of the middle binding sleeve clamping with a lower binding sleeve according to the present invention.

As shown in FIG. 4, the middle binding sleeve 30 includes a sliding slot 35 provided with an upper clamping column 36, a lower clamping column 37 and a spring 38, wherein the spring 38 pushes the upper clamping column 36 and the lower clamping column 37 to respectively protrude from an upper side and a lower side of the middle binding sleeve 30 so as to clamp the upper binding sleeve 20 and the lower binding sleeve 40, to uphold the three support rods 45 in the storage position or the unfolding position. The upper clamping column 36 and the lower clamping column 37 are respectively connected with an upper pressing key 361 and a lower pressing key 371 by a bolt 39, the upper pressing key 361 and the lower pressing key 371 protrude out of the middle binding sleeve 30. When the upper pressing key 361 and the lower pressing key 371 are pressed, the upper clamping column 36 and the lower clamping column 37 are not longer protruded out of the upper side and the lower side of the middle binding sleeve 30 by compressing the spring 38. In an embodiment, the upper binding sleeve 20 and the lower binding sleeve 40 are respectively provided with two upper through holes 22 and two lower through holes 42 for the upper clamping column 36 and the lower clamping column 37 passing through and fastening. As shown in FIG. 6A and FIG. 6B, a central angle between the two upper through holes 22 disposed on the upper binding sleeve 20 is 120 degree, and a central angle between the two lower through holes 42 disposed on the lower binding sleeve 40 is 120 degree. Thus, the three support rods 45 can be placed in the unfolding position or the storage position.

Figure 3:
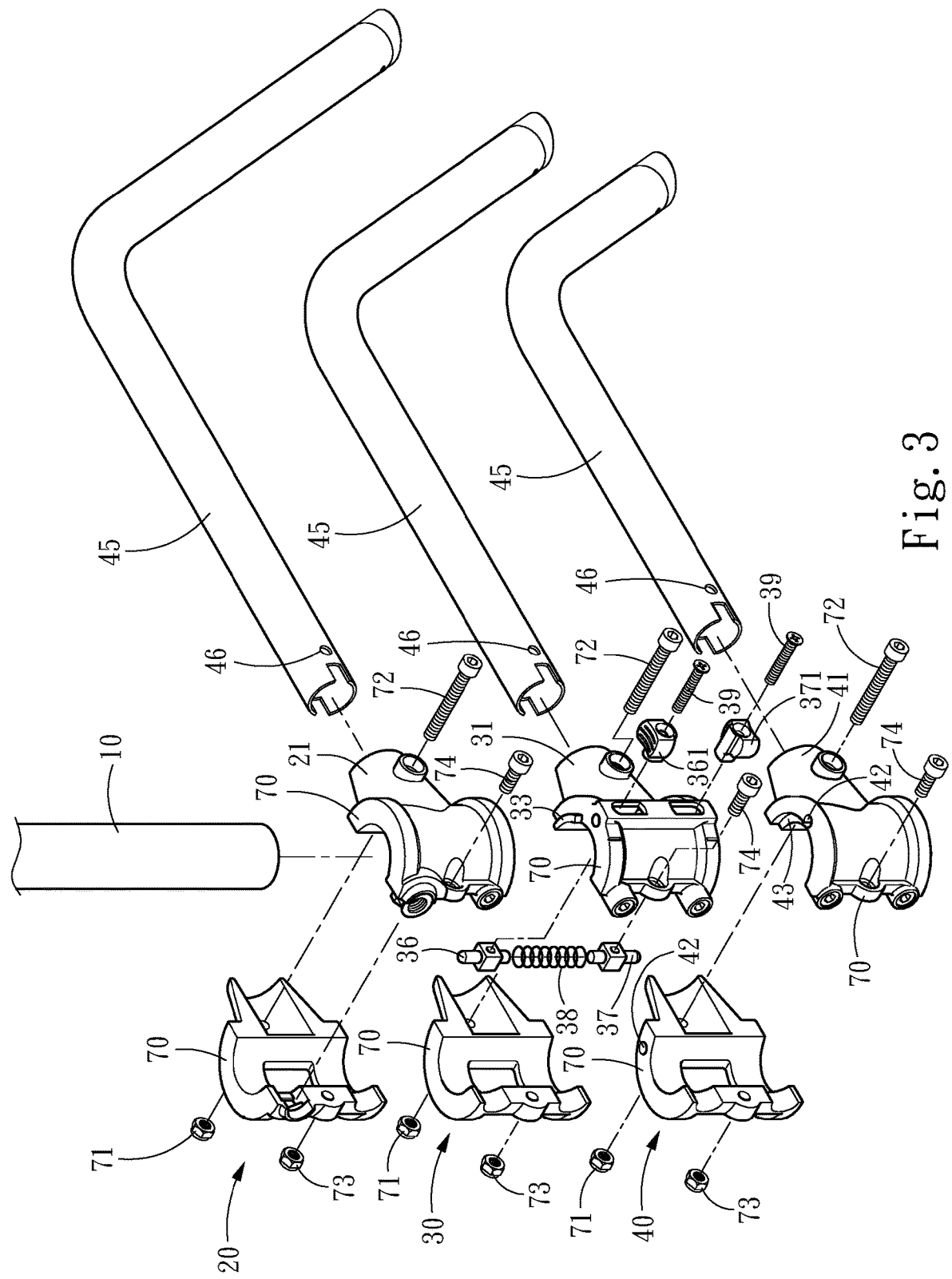
FIG. 3 is a partial exploded view of the present invention.

Also, as shown in FIG. 3, in a practical structure, the upper binding sleeve 20, the middle binding sleeve 30, and the lower binding sleeve 40 are respectively provided with two semi-circular arc blocks 70 for clamping the main tube 10, and the two semi-circular arc blocks 70 are fixed by locking a first nut 71 with a first bolt 72 and by locking a second nut 73 with a second bolt 74, respectively. Further, three first bolts 72 of the upper binding sleeve 20, the middle binding sleeve 30 and the lower binding sleeve 40 pass through three fixing holes 46 to fix the three support rods 45, respectively.

Referring to FIG. 3, FIG. 6A and FIG. 6B, in order for a user to quickly rotate two of the three support rods 45 relative to the upper binding sleeve 20 and the lower binding sleeve 40, and to make the three support rods 45 in the unfolding or storage position, an upper part and a lower part of the middle binding sleeve 30 are respectively provided with an upper circular arc protrusion 33 and a lower circular arc protrusion 34. The upper binding sleeves 20 is provided with an upper circular arc groove 23 for the upper circular arc protrusion 33 clamping therein, and the lower binding sleeve 40 is provided with a lower circular arc groove 43 for the lower circular arc protrusion 34 clamping therein, and a central angle of the upper circular arc groove 23 and a central angle of the lower circular arc groove 43 are 180 degrees respectively, a central angle of the upper circular arc protrusion 33 and a central angle of the lower circular arc protrusion 34 are 60 degrees respectively. A relative position of the upper circular arc groove 23 of the upper binding sleeve 20 and the upper circular arc protrusion 33 of the middle binding sleeve 30 is shown in FIG. 6A, and a relative position of the lower circular arc protrusion 34 of the middle binding sleeve 30 and the lower circular arc groove 43 of the lower binding sleeve 40 is shown in FIG. 6B. In FIG. 6A and FIG. 6B, the three support rods 45 are in the storage position (as shown in FIG. 2), and the upper clamping column 36 and the lower clamping column 37 are respectively inserted into the upper through hole 22 and the lower through hole 42 to clamp the upper binding sleeve 20 and the lower binding sleeve 40. The spring 38 is compressed when the upper pressing key 361 and the lower pressing key 371 are pressed, the upper clamping column 36 and the lower clamping column 37 are separated from the upper through hole 22 and the lower through hole 42 respectively. Therefore, as long as the upper binding sleeve 20 is anticlockwise rotated 120 degrees relative to the middle binding sleeve 30 (the upper circular arc protrusion 33 and the upper clamping column 36 are kept immovable), and then the lower binding sleeve 40 is clockwise rotated 120 degrees relative to the middle binding sleeve 30 (the lower circular arc protrusion 34 and the lower clamping column 37 are kept immovable), the three support rods 45 are turned into the unfolding position (as shown in FIG. 5), and at the moment the spring 38 pushes the upper clamping column 36 and the lower clamping column 37 to be re-clamped into the other upper through hole 22 and the other lower through hole 42.

As shown in FIG. 2, the upper limit sleeve 50 is sleeved on the main tube 10 and positioned over the upper binding sleeve 20 to limit the upper binding sleeve 20 from moving upward, and the lower limit sleeve 60 is sleeved on the main tube 10 and positioned under the lower binding sleeve 40 to limit the lower binding sleeve 40 from moving downward. By disposal of the upper limit sleeve 50 and the lower limit sleeve 60 to fix heights of the upper binding sleeve 20, the middle binding sleeve 30 and the lower binding sleeve 40 relative to the main tube 10.

For different support height requirements, the main tube 10 is further connected and fixed to one end of a first extension tube 12 by a first locking member 13, and the other end of the first extension tube 12 is connected and fixed to a second extension tube 14 by a second locking member 15. By the arrangement of the first extension tube 12 and the second extension tube 14, an overall height can be changed to meet the use requirements of different heights.

Figure 7:
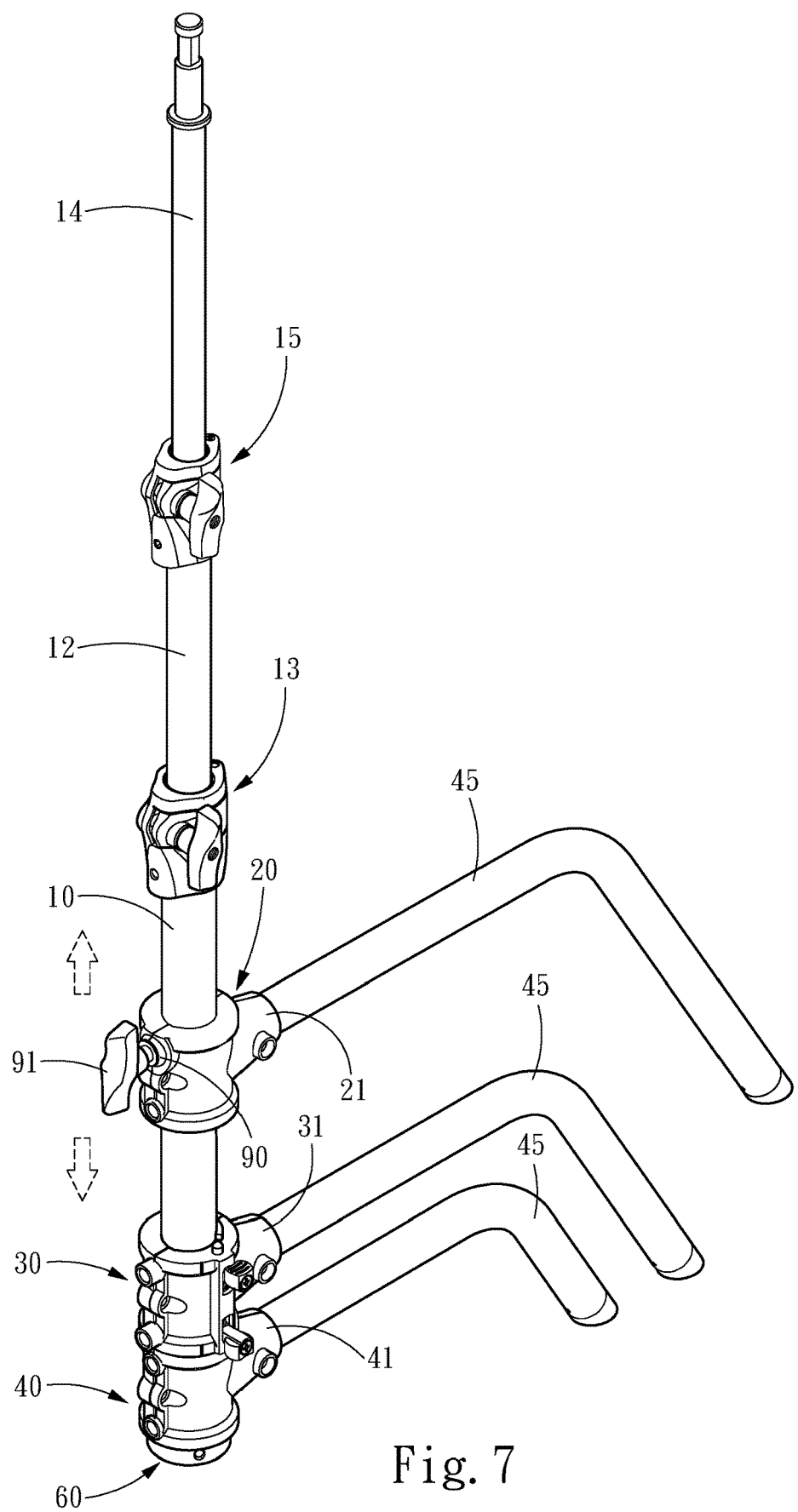
FIG. 7 is a first schematic view of an usage of another embodiment of the present invention.
Figure 8:
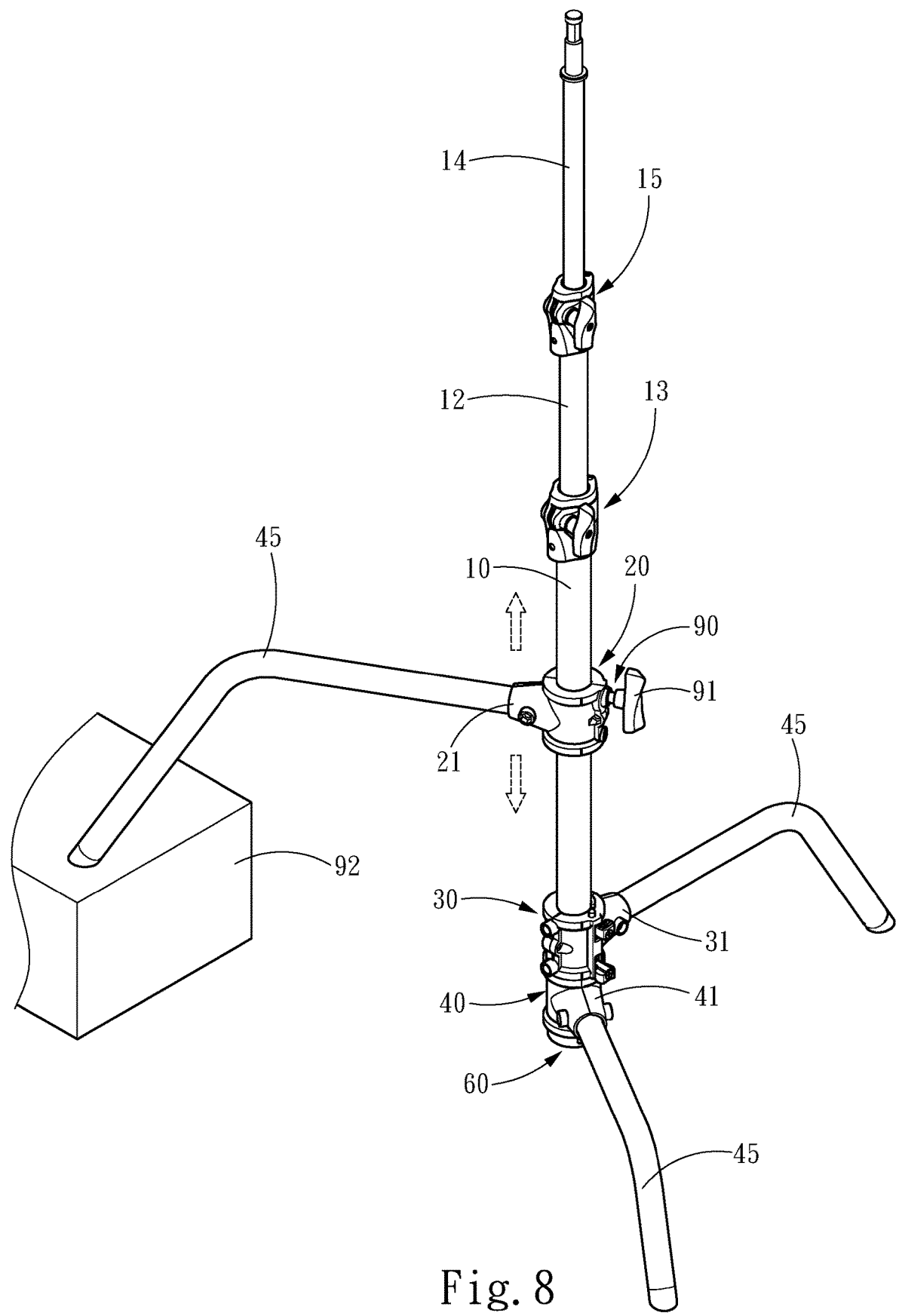
FIG. 8 is a second schematic view of the usage of another embodiment of the present invention.

Referring to FIG. 7 and FIG. 8, another embodiment of the present invention is provided. The upper binding sleeve 20 further includes a screw locking through-hole 90 and a locking knob 91, wherein the screw locking through-hole 90 and the locking knob 91 include a function of the upper limit sleeve 50 (shown in FIG. 2) without disposal of the upper limit sleeve 50, and the locking knob 91 passes through the screw locking through-hole 90 in a screw manner to be tightly pressed against the main tube 10 to fix a position of the upper binding sleeve 20 on the main tube 10, and the lower limit sleeve 60 is sleeved on the main tube 10 and positioned below the lower binding sleeve 40 to limit the lower binding sleeve 40 from moving downwards. Therefore, as long as the locking knob 91 is released, the upper binding sleeve 20 can be moved up and down relative to the main tube 10 to change a height of one of the three support rods 45 relative to the upper binding sleeve 20. After a desired height of one of the three support rod 45 relative to the upper binding sleeve 20 is adjusted, the upper binding sleeve 20 can be fixed again by re-locking the locking knob 91. Therefore, as shown in FIG. 8, when an irremovable obstacle 92 is located on a ground, one of the three support rods 45 relative to the upper binding sleeve 20 can be placed on the obstacle 92.

In summary, the invention includes following characteristics.

1. the three support rods are in the storage position or the unfolding position, the upper clamping column and the lower clamping column clamp the upper binding sleeve and the lower binding sleeve, respectively; and after the upper pressing key or the lower pressing key is pressed, the clamping state of the positioning structure is released, and two of the three support rods relative to the upper binding sleeve and the lower binding sleeve can be freely rotated, so that the three support rods can be rotated to the storage position or the unfolding position.

2. The upper binding sleeve can be fixed by the locking knob instead, and the upper binding sleeve can move up and down relative to the main tube as long as the locking knob is released, so that a height of one of the three support rods relative the upper binding sleeve is changed; and when the obstacle which is irremovable on the ground, one of the three support rods relative to the upper binding sleeve can also be placed on the obstacle.

3. By the design of the central angles and the relative positions of the upper circular arc protrusion, the lower circular arc protrusion, the upper arc groove and the lower arc groove, the three support rods can be quickly turned into the storage position or the unfolding position when the user rotates two of the three support rods relative to the upper binding sleeve and the support rod of the lower binding sleeve.

What is claimed is:

1. A positioning structure for tripod stand for quickly releasing a clamping state, comprising:
   a main tube;
   an upper binding sleeve, sleeved on the main tube to rotate freely, wherein the upper binding sleeve is provided with an upper joint tube;
   a middle binding sleeve, sleeved on the main tube to rotate freely, wherein the middle binding sleeve is provided with a middle joint tube;
   a lower binding sleeve, sleeved on the main tube to rotate freely, wherein the lower binding sleeve is provided with a lower joint tube; and
   three support rods, respectively connected to the upper joint tube, the middle joint tube and the lower joint tube;
   wherein the middle binding sleeve includes a sliding slot provided with an upper clamping column, a lower clamping column and a spring, and the spring pushes the upper clamping column and the lower clamping column to respectively protrude from an upper side and a lower side of the middle binding sleeve to clamp the upper binding sleeve and the lower binding sleeve, upholding the three support rods in a storage position or an unfolding position; and
   wherein the upper clamping column and the lower clamping column are respectively connected with an upper pressing key and a lower pressing key, and the upper pressing key and the lower pressing key protrude out of the middle binding sleeve; and when the upper pressing key and the lower pressing key are pressed, the upper clamping column and the lower clamping column are not longer protruded from the upper side and the lower side of the middle binding sleeve by compressing the spring.

2. The positioning structure according to claim 1, wherein the upper binding sleeve and the lower binding sleeve are respectively provided with two upper through holes and two lower through holes for the upper clamping column and the lower clamping column passing through and fastening, a central angle between the two upper through holes disposed on the upper binding sleeve is 120 degree, and a central angle between the two lower through holes disposed on the lower binding sleeve is 120 degree.

3. The positioning structure according to claim 1, further comprising an upper limit sleeve and a lower limit sleeve, wherein the upper limit sleeve is sleeved on the main tube and positioned above the upper binding sleeve to limit the upper binding sleeve from moving upwards, and the lower limit sleeve is sleeved on the main tube and positioned below the lower binding sleeve to limit the lower binding sleeve from moving downwards.

4. The positioning structure according to claim 1, wherein the positioning structure further comprises a lower limit sleeve, wherein the upper binding sleeve includes a screw locking through-hole and a locking knob, and the locking knob passes through the screw locking through-hole in a screw manner to be tightly pressed against the main tube to fix a position of the upper binding sleeve on main tube; and the lower limit sleeve is sleeved on the main tube and positioned below the lower binding sleeve to limit the lower binding sleeve from moving downwards.

5. The positioning structure according to claim 1, wherein an upper part and a lower part of the middle binding sleeve are respectively provided with an upper circular arc protrusion and a lower circular arc protrusion, the upper binding sleeve is provided with an upper circular arc groove for the upper circular arc protrusion clamping therein, the lower binding sleeve is provided with a lower circular arc groove for the lower circular arc protrusion clamping therein; and a central angle of the upper circular arc groove and a central angle of the lower circular arc groove are 180 degrees respectively, and a central angle of the upper circular arc protrusion and a central angle of the lower circular arc protrusion are 60 degrees respectively.

6. The positioning structure according to claim 1, wherein the main tube is connected and fixed to one end of a first extension tube fixed by a first locking member, and the other end of the first extension tube is connected and fixed to a second extension tube by a second locking member.

7. The positioning structure according to claim 1, wherein the upper binding sleeve, the middle binding sleeve and the lower binding sleeve are respectively provided with two semi-circular arc blocks for clamping the main tube.

\* \* \* \* \*